United States Patent

Holsinger

[15] 3,701,037

[45] Oct. 24, 1972

[54] ACTIVE FILTER

[72] Inventor: Jerry L. Holsinger, Lexington, Mass.

[73] Assignee: Intertel, Inc., Burlington, Mass.

[22] Filed: June 24, 1971

[21] Appl. No.: 156,380

[52] U.S. Cl. ..............330/107, 330/124 R, 330/30 R

[51] Int. Cl. ..............H03f 1/36

[58] Field of Search ......330/98, 124 R, 30 R, 26, 12, 330/107

[56] References Cited

UNITED STATES PATENTS 2,831,975 4/1958 Catherall ...............330/107 X

*Primary Examiner*—Nathan Kaufman

*Attorney*—Cesari & McKenna

[57] ABSTRACT

An active filter circuit. Two cascaded phase shift networks are in circuit with the non-inverting input terminal of an operational amplifier. A resistive feedback network couples the amplifier output back to the first of the phase shift networks. When an external input signal is applied to both phase shift networks and the inverting input terminal of the amplifier, the filter circuit has a pass band and a stop band. Inputs to any single one of these points selectably provide high-pass, low-pass and band-pass operation.

7 Claims, 4 Drawing Figures

INVENTOR
JERRY L. HOLSINGER
BY
Cesari and McKenna
ATTORNEYS

INVENTOR
JERRY L. HOLSINGER
BY
Cesari and McKenna
ATTORNEYS

ACTIVE FILTER

BACKGROUND OF THE INVENTION

This invention generally relates to filter circuits and more specifically to active filter circuits.

While the general principles of active filters have been known for many years, it is only recently that such filters have gained widespread acceptance. The present vogue for such filters stems primarily from two factors. The first of these is the advent of integrated circuits and the resultant marked reduction in cost of amplifiers, the basic components of active filters. The second factor is the present need for low-frequency filters, for example for digital data transmission over telephone lines or other low-frequency media. At low frequencies, the reactive components required for pole and notch characteristics in passive filters are large in size and relatively expensive. This makes active filters, with their small size and inexpensive components quite attractive for low-frequency applications.

In a data processing system digital signals may be modulated onto, and demodulated from, a carrier for transmission over a common line between central and remote locations. Normally, the central location comprises a transmitter for generating a carrier at one frequency while a transmitter at the remote location generates a carrier at another frequency. The frequency difference between these two carriers may be in the order of ten percent of the carriers themselves. For example, carrier frequencies of 2,200 Hz and 2,400 Hz are common.

With this frequency relationship, it is possible for a carrier signal transmitted at one location to "overload" the receiver at that location even though different frequencies are involved. There are several ways to isolate a transmitter and receiver at one location to reduce overloading. In terms of the present invention the most important of these includes a band-pass filter for the receiver carrier and a notch filter for the transmitted carrier, both of which are cascaded with the receiver input terminals.

In these applications, it is also desirable to provide a filter circuit with tunable stop and pass bands. Thus, for example, if the tuning range includes both transmitted carriers in a data processing system, identical filter circuits can be manufactured and then tuned as necessary.

One prior filter circuit uses several operational amplifiers as cascaded integrators and summing circuits. Each integrator output is coupled through one of a first set of potentiometers to be summed with an input signal. In addition, another set of potentiometers couple each integrator output to another summing circuit which generates an output signal. This circuit provides both a pass-band and a stop-band and the center frequencies of these bands are varied independently by adjusting the potentiometers. These filter circuits perform well enough in their intended applications, but they are characterized by a relatively high cost resulting from the number of operational amplifiers used in them.

In another filter circuit an input signal is applied directly to the inverting input terminal of a single operational amplifier and, through a high-pass filter, to the non-inverting input terminal. A low-pass filter circuit is also used as a regenerative feedback network. The combined filter circuit operates as a notch filter and is useful in applications where low quality factors at low frequencies are desirable. However, it is not adquate for the foregoing digital communications application because if the amplifier gain is increased to provide the required quality factor, the circuit becomes unstable.

Therefore, it is the primary object of this invention to provide an active filter with tunable pass and stop bands primarily adapted for low-frequency digital data transmission systems.

Another object of this invention is to provide an active filter with tunable pass and stop bands which is more economical than prior filter circuits having the desired operational characteristics.

SUMMARY

In accordance with my invention, incoming signals are applied simultaneously to a pair of cascaded low-pass filter sections and to both input terminals of a first operational amplifier. The first low-pass section comprises a second operational amplifier connected as an integrator while the second filter section, which is conventional filter, is connected to the non-inverting input terminal of the first operational amplifier. A portion of the output signal is fed back to the integrator. The resulting circuit has a pass band and a stop band which can easily be shifted independently by varying resistive components in the circuit.

This filter circuit has several significant advantages over prior circuits. It is more economical to manufacture because it requires fewer operational amplifiers than the prior filter circuits with variable pass and stop-band capabilities. At the same time it has quality factors and stability that are highly satisfactory for low-frequency digital communications systems. The filter circuit also converts to a band-pass, a high-pass or a low-pass filter without significant modification.

This invention is pointed out with particularity in the appended claims. A more thorough understanding of the above and further objects and advantages of this invention may be attained by referring to the following description taken in conjunction with the accompanying drawings.

DESCRIPTION OF AN ILLUSTRATIVE EMBODIMENT

Figure 1:
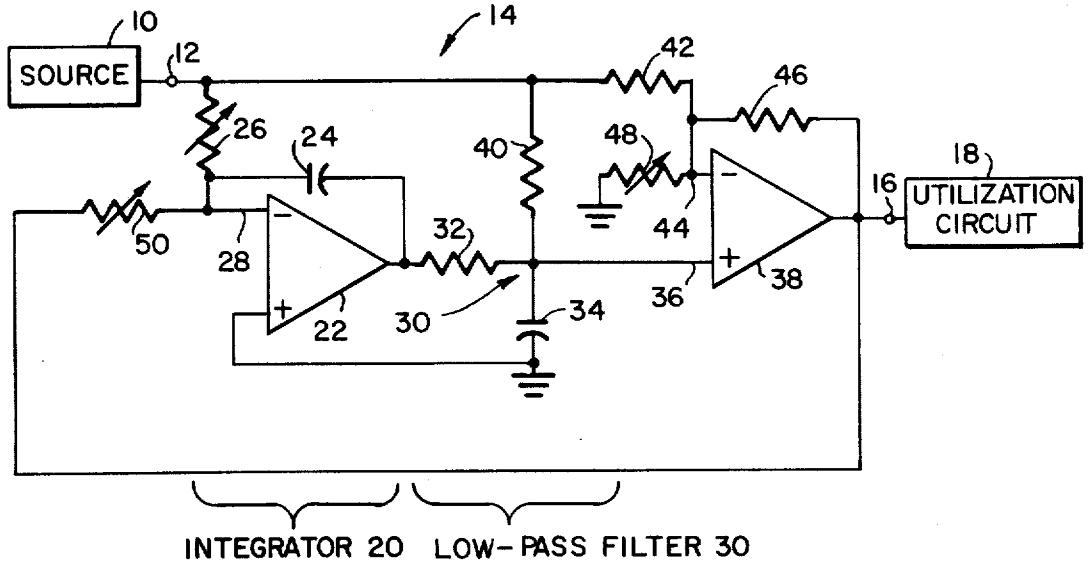
FIG. 1 is a schematic diagram of a filter circuit constructed in accordance with my invention.

In FIG. 1 a source 10 is connected to an input terminal 12 of a filter circuit 14. An output terminal 16 is connected to a utilizatiõn circuit 18 such as a receiver or transmission line. The source 10 emits to the filter circuit 14 both signals and interfering energy in a spectrum of frequencies, while the utilization circuit 18 is to respond only to the signals, which occupy specific portions of the spectrum.

One portion of the output of the source 10 is integrated by an integrator 20 comprising an operational amplifier 22 with a negative feedback capacitor 24 and a variable input resistor 26. Since the input is applied to an inverting input terminal 28, the integrator 20 functions as both a low-pass filter and a lead network having a phase lead of 90°; this phase shift is independent of frequency.

The second phase shift circuit is a low-pass filter 30 cascaded with the integrator 20. This filter comprises a series resistor 32 and a shunt capacitor 34. It imparts a phase lag to its input from the integrator 20, the magnitude of the phase shift increasing with frequency.

The capacitor 34 is also connected to a second input resistor 40, so that another portion of the input from the source 10 is applied to the capacitor 34 without passing through the filter 20. A resulting second voltage component across the capacitor 34 thus has a frequency-dependent phase lag in accordance with the values of the resistor 50 and capacitor 34.

A third portion of the output of the source 10 is applied to an operational amplifier 38 through a resistor 42 connected to an inverting input terminal 44. Also the output of the low-pass filter 30 is applied to a non-inverting input terminal 36 of the amplifier 38. Resistors 42, 46 and 48 form a negative feedback network controlling the gain of the amplifier 38. A variable resistor 50 connected tetween the output of the amplifier 38 and the inverting input terminal 28 of the amplifier 22 provides a feedback path for the filter 14.

Known mathematical analysis, such as described in Mitra, Analysis and Synthesis of Linear Active Networks, John Wiley & Sons, Inc., 1969, provides the following transfer function, H(s), for the filter circuit 14:

$$H(s)=\frac{\frac{R_{46}}{R_{42}}R_{50}R_1C_{24}C_{34}S^2+\left[\frac{R_{46}}{R_{42}}-K(1-K_1)\right]R_{50}C_{24}S+\frac{K_1K}{K_2}}{R_{50}R_1C_{24}C_{34}S^2+R_{50}C_{24}S+KK_1}$$

where $$S=j\omega$$

$$R_1=\frac{R_{32}R_{40}}{R_{32}+R_{40}}$$

$$K=\frac{R_{46}+\frac{R_{42}R_{48}}{R_{42}+R_{48}}}{\frac{R_{42}R_{48}}{R_{42}+R_{48}}}$$

$$K_1=\frac{R_1}{R_{32}}$$

$$K_2=\frac{R_{26}}{R_{50}}$$

and assuming a negligible output impedance for the source 10.

From the foregoing formulas it can be seen that, if R46/R42 = $K(1-K_1)$, there is a single realizable frequency $\omega_1$ at which the numerator is zero, i.e., at which H($s$) is zero and the output of the filter is therefore zero.

Also, there is a frequency $\omega_2$ at which the denominator is a minimum and the filter output is at a maximum.

Considering first the manner in which the filter 14 operates at the frequency ω1, with no output signal from the operational amplifier 38, the signals at the input terminals 36 and 44 have the same phase and their relative amplitudes are such as to provide equality (cancellation) in the amplifier output. Also there is no feedback through the potentiometer 50.

As previously indicated, the voltage at the amplifier terminal 44 is in phase with the input signal from the source 10 notwithstanding its frequency. On the other hand, the voltage at the terminal 36 comprises (1) a net lead component generated by the integrator 20 and low-pass filter 30 and (2) a lag component produced by the resistor 40 and capacitor 34. The phase angle of each component varies with frequency, and at ω1, the resultant phase shift at the terminal 36 is zero, while the amplitude bears the correct ratio to the terminal 44 signal to provide cancellation in the amplifier 38 output. This ratio depends on the relative gains for inputs at the terminals 36 and 44 as determined by resistors 42, 46 and 48.

The frequency ω1 can be varied by adjusting the resistor 26. This varies the magnitude of the lead component of the signal voltage across the capacitor 34 and thus changes the frequency at which the lead and lag effects are equalized at the capacitor 34. To control both phase and amplitude of the terminal 36, one must vary two parameters. One of these can be the resistor 26 as noted; the other may be the resistor 40.

Preferably, however, amplitude adjustment is accomplished by varying the relative gains of the amplifier 38 for its two inputs. This is done most easily by adjusting the resistor 48, which affects the gain for the signal at the terminal 36 without affecting the gain for the terminal 44 input. By thus providing amplitude adjustment independently of relative phase, I simplify the setting of ω1. One need merely adjust R26 (or R32 or R40) to obtain the requisite zero phase shift at the terminal 36 and then adjust R48 (or R46 or R42) to obtain a null in the output of the amplifier 38 at ω1.

The frequency ω2 at which the filter has a maximum response is determined largely in accordance with the denominator of the formula for H(s). However, since the denominator does not reach zero at any realizable frequency, the function defined by the numerator will also have some effect on the frequency ω2. In general the amount by which the numerator affects ω2 depends on the slope of the magnitude of the numerator at the frequency at which the magnitude of the denominator is a minimum. The greater the slope of the numerator magnitude, the greater its effect on ω2.

It will be apparent from the foregoing discussion and by inspection of the H(s) formula, that of all the elements in the feedback loop, the resistor 50 is the only one that does not affect the null frequency ω1. Therefore, I prefer to set ω2 by adjusting this resistor.

From this it follows that ordinarily one will adjust ω1 first and then adjust R50 to set ω2, thereby decreasing the number of repetitive circuit adjustments that are usually required when mutually dependent parameters are to be set.

A filter such as shown in FIG. 1 has been constructed with the following circuit values:

| | |
|---|---|
| **Capacitor 24 - .01 μfd** | **Resistor 32 - 25.2 kilohms** |
| **Potentiometer 26 - 50 kilohms** | **Capacitor 34 - .027 μfd** |
| | **Resistor 40 - 1 megohm** |

Resistor 42 - 80 kilohms
Resistor 46 - 10 kilohms
Resistor 48 - 2.5 kilohms
Resistor 50 - 13.3 kilohms With these circuit values and the potentiometer 26 set at 26.5 kilohms, the filter circuit 14 produces a null at 2400 Hz and a maximum response at 1200 Hz. The circuit 14 has a quality factor Q of 5 for the pass band (around $\omega 2$) and a notch depth of 40db (around $\omega 1$). Further, variations of the potentiometer *2b* alter the stop band center frequency. It should be realized, however, that these variations tend to reduce the notch depth, so required notch depth does limit the range of potentiometer variations.

The circuit exhibits improved stability and, in fact, it meets the requirements for digital data transmission systems. Further, the number of operational amplifiers is only two. Hence, my filter circuit reduces manufacturing costs without degrading performance for these applications.

Figure 2:
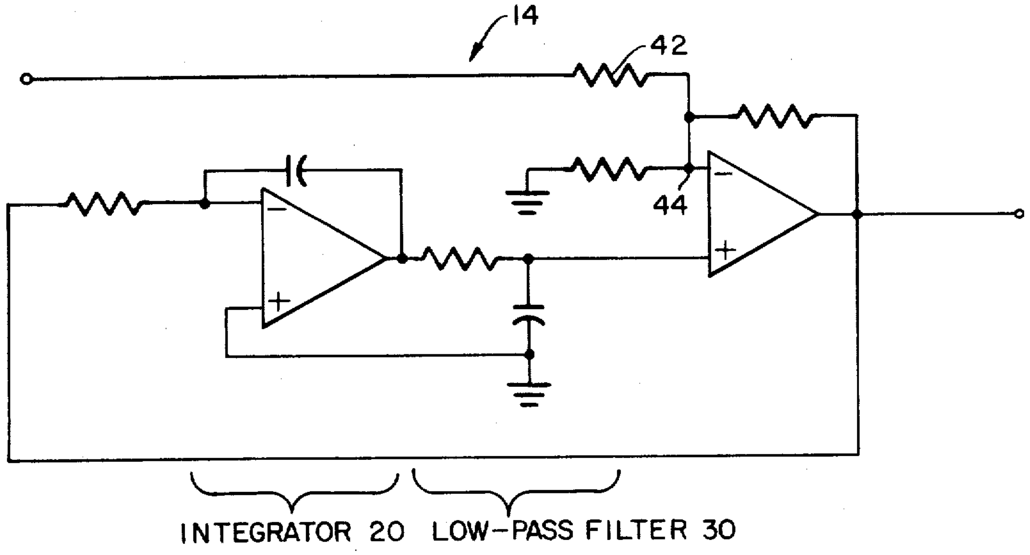
FIG. 2 is a schematic diagram of the filter circuit as adapted for high-pass operation.

As previously indicated, the input connections to the filter circuit may be varied to provide different characteristics. In FIG. 2, for example, the filter circuit does not include the resistors 26 and 40 (FIG. 1). Thus the input signal is applied only to the amplifier 38 through the resistor 42. The integrator 20 and the low-pass filter 30 are cascaded to feed back to the non-inverting input terminal 36.

In FIG. 2, as the frequency approached zero, operation of the integrator 20 provides a servo-like action that cancels at the output terminal the component thereat resulting from the input at the terminal 44, thus resulting in a zero net output voltage. At high frequencies the feedback loop has negligible effect and the gain therefore approaches the ratio R46/R42. The circuit thus operates as a high-pass filter.

Figure 3:
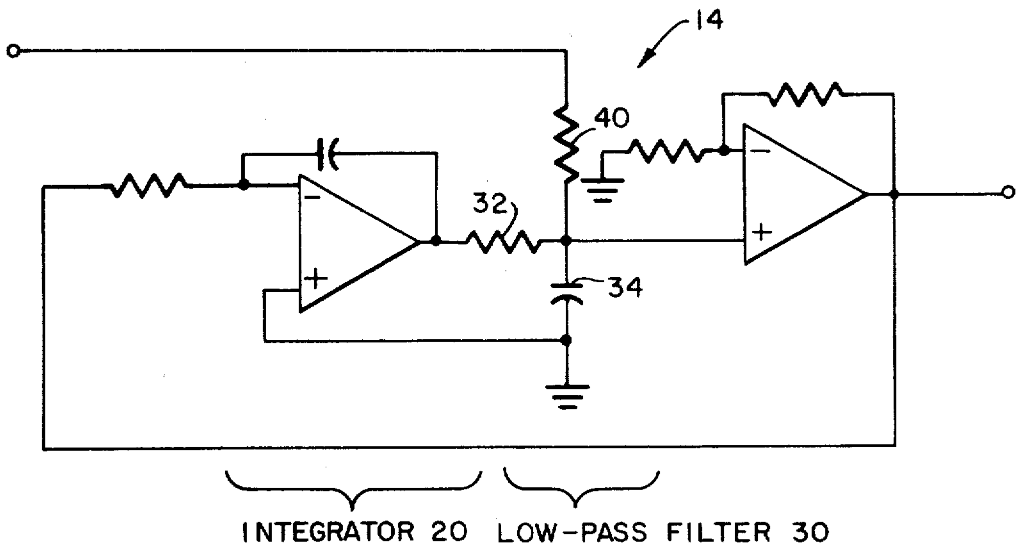
FIG. 3 is a schematic diagram of the filter circuit as adapted for band-pass operation; an FIG. 4 is a schematic diagram of the filter circuit as adapted for low-pass operation.

In FIG. 3, the input signal is applied solely through the resistor 40. At low frequencies operation is similar to that of FIG. 2 in that the integrator 20 tends to null the signal at the junction of resistors 32 and 40, with a resulting gain approaching zero. At high frequencies, the low-pass filter section 30 comprising R40 and C34 reduces the overall gain essentially to zero. The circuit thus operates as a band-pass filter.

Figure 4:
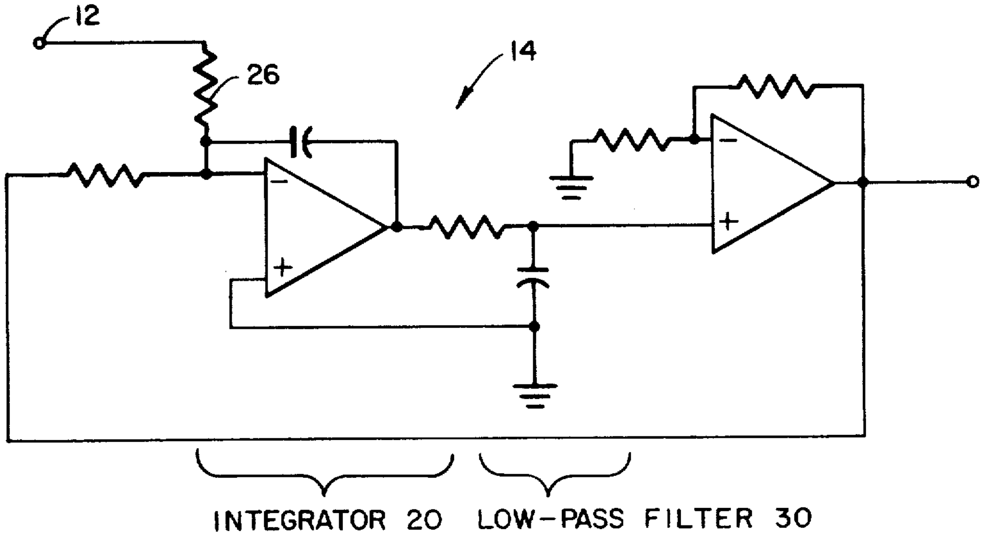

Finally, in FIG. 4, the signal at the input terminal 12 is coupled to the circuit only through the resistor 26. In this embodiment, the integrator 20, a low-pass filter is cascaded with the low-pass filter 30. Thus, the output decreases as the signal frequency increases and the circuit therefore functions as a low-pass filter.

It will be apparent that the filter circuit 14 is readily converted into any of the illustrated embodiments. For example, solid state switches, such as field effect transistors, can be used to pass the input signal through any one or more of the resistors 26, 40 and 42.

Thus, I have described an active filter circuit which operates in any one of several modes. In one mode, the circuit has independently tunable pass and stop bands. In other, easily obtainable modes it is a high-pass, low-pass or band-pass filter. It is stable and has a quality factor that is highly satisfactory for receivers responding to low-frequency, frequency-shift keyed signals.

These features are obtained with a relatively simple circuit containing fewer operational amplifiers than prior comparable filters.

It will be appreciated that somewhat different arrangements can be employed without departing from the invention. For example, and not by way of limitation, the circuit can comprise inductive as well as capacitive elements in the phase shift networks.

What I claim as new and desire to secure by Letters Patent of the United States is:

1. A filter for connection between a signal source and a utilization circuit, said filter comprising:

A. a first phase shift network,

B. a second phase-shift network energized by the first phase shift network,

C. a summing network energized by the second phase shift network, the output from said summing circuit being coupled to the input of said first phase shift network, D. means for connecting the signal source to said first and second phase shift networks and said summing circuit.

2. A filter as recited in claim 1 wherein said first phase shift network is an integrator.

3. A filter as recited in claim 1 wherein said second phase shift network is a lag network.

4. A filter as recited in claim 1 wherein said summing network comprises an operational amplifier with first and second input terminals, said first input terminal being connected to said connecting means and said second input terminal being connected to said second phase shift network.

5. A filter as recited in claim 1:

A. wherein said first phase shift network is an integrator,

B. wherein said second phase shift network imparts a phase shift in a direction generally opposite to that of said integrator, C. including feedback means between the output of said filter and the input of said first phase shift network, and D. wherein said connecting means connects the signal source to said phase shift networks and said summing circuit simultaneously thereby to provide the filter with both pole and notch characteristics.

6. A filter with a stop band and a pass band for connection between a signal source and utilization circuit, said filter comprising:

A. first and second operational amplifiers,

B. capacitive negative feedback means for said first operational amplifier,

C. a first resistor coupling the input terminal of said first operation amplifier to the signal source, D. a lag network energized by said first operational amplifier, the output of said lag network being coupled to a first, non-inverting input terminal of the second operational amplifier, E. means coupling the signal source to the lag network, F. a third resistor coupling the source to an inverting second input of said second operational amplifier, and G. a fourth resistor connected between the output of said second operational amplifier and the input terminal of the first operational amplifier.

7. A filter circuit as recited in claim 6 wherein:

A. said lag network comprises a fifth resistor and a second capacitor, and

B. said coupling means comprises a sixth resistor connected between said source and said second capacitor.

* * * * *